US008166410B2

(12) United States Patent
Tadman et al.

(10) Patent No.: US 8,166,410 B2
(45) Date of Patent: Apr. 24, 2012

(54) METHODS AND SYSTEMS OF ONLINE MAPPING AND PLANNING DRIVING TOURS

(75) Inventors: Frank Tadman, San Jose, CA (US); Evelyn Horng, Los Altos, CA (US)

(73) Assignee: MLSListings Inc., Sunnyvale, CA (US)

( * ) Notice: Subject to any disclaimer, the term of this patent is extended or adjusted under 35 U.S.C. 154(b) by 663 days.

(21) Appl. No.: 11/965,061

(22) Filed: Dec. 27, 2007

(65) Prior Publication Data

US 2008/0168369 A1 Jul. 10, 2008

Related U.S. Application Data

(60) Provisional application No. 60/877,564, filed on Dec. 27, 2006.

(51) Int. Cl.
*G06F 3/00* (2006.01)
*G01C 21/00* (2006.01)

(52) U.S. Cl. ......... 715/764; 701/202; 701/206; 701/208

(58) Field of Classification Search .................. 715/764; 701/202, 206, 208
See application file for complete search history.

(56) References Cited

U.S. PATENT DOCUMENTS

| | | | |
|---|---|---|---|
| 6,182,008 B1 * | 1/2001 | Nikiel et al. ................. | 701/202 |
| 6,323,885 B1 * | 11/2001 | Wiese ........................... | 715/835 |
| 6,385,622 B2 | 5/2002 | Bouve et al. | |
| 6,415,291 B2 | 7/2002 | Bouve et al. | |
| 6,636,803 B1 * | 10/2003 | Hartz et al. ................... | 701/208 |
| 6,691,027 B1 * | 2/2004 | Tu ................................. | 701/202 |
| 7,149,625 B2 * | 12/2006 | Mathews et al. .............. | 701/209 |
| 7,239,960 B2 * | 7/2007 | Yokota et al. ................. | 701/202 |
| 2002/0002467 A1 * | 1/2002 | Ho ................................. | 705/1 |
| 2003/0064705 A1 * | 4/2003 | Desiderio ..................... | 455/412 |
| 2005/0086158 A1 * | 4/2005 | Clare ............................. | 705/38 |
| 2005/0187707 A1 * | 8/2005 | Yokota et al. ................. | 701/209 |
| 2006/0020518 A1 * | 1/2006 | Lovison et al. ................ | 705/26 |
| 2006/0106625 A1 * | 5/2006 | Brown .......................... | 705/1 |
| 2006/0190285 A1 * | 8/2006 | Harris et al. ................... | 705/1 |
| 2006/0265119 A1 * | 11/2006 | McMahan et al. ........... | 701/209 |
| 2006/0271277 A1 * | 11/2006 | Hu et al. ....................... | 701/202 |
| 2007/0069923 A1 * | 3/2007 | Mendelson .................. | 340/988 |
| 2007/0150292 A1 * | 6/2007 | Nichols ......................... | 705/1 |
| 2007/0288155 A1 * | 12/2007 | Kaneda ......................... | 701/200 |
| 2007/0294028 A1 * | 12/2007 | Gray et al. .................... | 701/209 |
| 2008/0077317 A1 * | 3/2008 | Zabel et al. ................... | 701/201 |
| 2008/0103686 A1 * | 5/2008 | Alberth et al. ................ | 701/200 |
| 2008/0109756 A1 * | 5/2008 | Stambaugh .................. | 715/835 |
| 2009/0031246 A1 * | 1/2009 | Cowtan et al. ................ | 715/786 |
| 2009/0105941 A1 * | 4/2009 | Johnston et al. .............. | 701/202 |

OTHER PUBLICATIONS

Google Map. Available at http://maps.google.com/maps?hl=en&tab=wl. Accessed on Apr. 7, 2008.

* cited by examiner

*Primary Examiner* — Ryan Pitaro

(74) *Attorney, Agent, or Firm* — Wilson Sonsini Goodrich & Rosati

(57) ABSTRACT

This invention is directed to methods and systems of online mapping and planning driving tours. The invention may include a user interface capable of displaying a map with one or more destinations and/or displaying a travel route to visit each destination. The travel route may vary based on customizable options. The invention may also provide a tour summary that may show the driving directions for the travel route.

14 Claims, 17 Drawing Sheets

METHODS AND SYSTEMS OF ONLINE MAPPING AND PLANNING DRIVING TOURS

CROSS-REFERENCE

This application claims the benefit of priority to U.S. Provisional Application No. 60/877,564 filed Dec. 27, 2006, which is incorporated herein by reference.

FIELD OF INVENTION

This invention is directed to methods and systems for mapping and planning driving tours for real property listings. In particular, the invention may display a map with one or more real estate listing destinations and display a travel route to visit each destination. The travel route may vary based on customizable options. The invention may also provide an open house tour or an agent tour that may show the driving directions for the travel route to each property.

BACKGROUND

Various technologies have been developed that provide map-related services. Internet sites are available that provide maps, directions for traveling to a desired destination from a specified starting point, and other map- or navigation-related services. Conventional Internet mapping services, and the like, may provide a means by which a user can input a location which may be displayed on a map. A user may input another location in order to determine driving routes and provide driving directions to and from the first location to the second.

Internet mapping sites may also allow a user to add on additional destinations to an already existing travel route. The new destinations may be added to the pre-existing route so that they are tacked onto the end of the route in the order that they are added. Destination order may be modified by dragging and the route may be changed accordingly. However, current Internet mapping sites do not provide a great deal of flexibility when dealing with multiple destinations, and the types of routes that a user may wish to have. For instance, a user may wish to easily manage a list of destinations that includes more than just one or two stops along selected routes. Also, a user may wish for the Internet mapping site to calculate an optimal travel route and order based on various criteria.

Accordingly, there is a need for a method or system to manage driving tours with multiple destinations with navigation-related or map-related features from a computer-based system that provides such features.

SUMMARY OF INVENTION

The invention provides methods and systems for mapping and planning of driving tours for real property listings. Various aspects of the invention described herein may be applied to any of the particular applications set forth below or for any other types of mapping and navigation methods or systems. The invention may be applied as a standalone system or method, or as part of an integrated mapping application. It shall be understood that different aspects of the invention can be appreciated individually, collectively, or in combination with each other.

An aspect of the invention is directed to methods and systems for supporting the online mapping and planning driving tours. The invention may include a user interface capable of displaying a map with one or more destinations, including real property listing destinations, and displaying a travel route to visit each destination. The travel route may vary based on customizable options. The invention may also provide a tour summary that may show the driving directions for the travel route.

The system of online mapping and planning driving tours may include a user interface which may display maps with one or more destinations, and plan routes for driving tours to visit each destination. In one embodiment of the invention, the user interface may include a map view displaying the destinations, and a directions view displaying a map with selected destinations and a travel route connecting them and driving directions.

The system may display a map of selected destinations. The user interface may show the map in a map view. In one embodiment of the invention, the selected destinations may be chosen from the results of a destination search. For example, in real estate, a user of a multiple listing service, which may maintain and regulate data regarding real property listings, may search for real property listings accessible by the multiple listing service. The user may narrow the scope of the search using various criteria. From a given set of search results, a user may select properties to map.

When a user maps selected destinations, a geographic map may be displayed showing the selected destinations. The destinations may be marked on the map with a destination indicator. The destination indicator may have characteristics which may provide additional information about the destination and may help categorize the destination. In one embodiment of the invention, the geographic map and a list of the selected destinations may be displayed simultaneously. The destination indicators on the map may have corresponding destination indicators for destinations as they appear on the destination list. For example, the destinations on the list may have destination indicators that may be flags numbered in the order that the destinations appear. The destination indicators on the map may be corresponding flags that show the same number. Another destination indicator characteristic may be color, which may denote a category for the destination. For instance, if the destination is a property listing, the destination indicator may be a flag that is color coded to indicate the property listing status, such as if the property is active, pending with release and being shown, pending and being shown, pending and not being shown, sold, expired, cancelled, or withdrawn.

In one embodiment of the invention, the destinations on the destination list may be real property listings. The destination list may include additional information for each destination besides the destination address. For example, for real property listings, the destination list may include the property address, the price, the number of rooms, or other property features.

After a user has mapped the selected destinations, the user may choose to delete a destination from the tour. In one embodiment, the map and the destination list may be displayed simultaneously, and the user may delete a destination by selecting a delete option for the destination as shown on the list. A destination that is deleted from the list may also remove the corresponding destination indicator from the map.

After a user has mapped the selected destinations, the user may also choose to view information about a destination. The user may view destination detail by interacting with the destination indicator on the map. In one embodiment, the user may rest the user's mouse pointer over a flagged location in the map and see a brief description of the destination. If the geographic map and list of selected destinations are simultaneously displayed, the user may rest the user's mouse pointer over the corresponding flag of a destination on the destination list to see the brief description.

In one embodiment of the invention, a user may map selected real property listing destinations. The user may view a brief description of a real property listing by resting the user's mouse pointer over a real property destination indicator. The brief description for a real property listing may include a summary of essential listing information, such as a picture of the property, the address, the number of rooms, the size, the price, the age, and other features of the property.

In one embodiment, the brief description of the destination may appear as a pop-up window. The pop up window may remain visible as long as the user's mouse is over the flag. The user may choose to keep the brief description open even when the user's mouse is not over the flag by selecting on an option. The option could be a button or a graphic, such as a push pin, that the user may click to allow the description to remain open. The pop up window may also have an option that allows the user to close the window after the user had chosen to keep it open.

After the user has viewed the brief description, the user may elect to view a more detailed description of the destination. In one embodiment of the invention, the user may select the option to view a more detailed description of the destination by clicking on an option to view more in the brief description. For example, for real property listings, if the brief description shows a summary of the essential listing information, the detailed description may be a full agent's report. In one embodiment, viewing the detailed description may direct a user away from a map view and to a new screen showing the detailed description. The user may return to the map view by clicking on an option in the detailed description screen.

After the user has mapped selected destinations, the user may control the map view by zooming and panning. In one embodiment of the invention, the map may have a set of controls that allow a user to zoom in or out, or pan up, down, left, or right. The user may also pan by clicking on the map and dragging.

The system may plan routes for driving tours to visit one or more destinations. A user may access a directions view to get driving directions for selected destinations and create driving tours. The user may select destinations that appear on a map from a map view to be a destination for the driving tour. If a geographic map and a destination list are displayed simultaneously, the user may select destinations as they appear on the destination list. For example, the user may select a destination by clicking on a box next to each destination the user wishes to select.

When the user has selected the desired destinations for the driving tour, the user may select an option that may create the driving tour and display it on a map. In one embodiment, selecting the option may bring up a directions view that may display a map with the driving tour, a destination list, and a tour summary which may show the driving directions for the entire driving tour. The tour summary may organize the driving directions in a number of ways. For example, the driving directions may be broken up by destination.

A driving tour may have a starting point and a return point, which may be customizable. In one embodiment of the invention, the starting and/or return points may default to a user's home office, which may be stored in the system. In another embodiment of the invention, the starting point may default to the first destination on a destination list. A user may change the starting location of a driving tour by choosing a new location from a drop-down list, which may include addresses stored on the system for the user. For example, the addresses stored may include office and home addresses for the user, or any other addresses that the user may have recently entered. A user may also choose to change the starting location by typing in a new address. After a user has selected a new starting point, the user may select an update option so that the travel route map and driving directions may be updated with the new starting point. These and other features related to the selection of a starting point may be similarly applied to establishing a return or end point in accordance with other embodiments of the invention.

The user may select different options for the travel routes of the driving tours. For instance, a user may choose a driving tour with the quickest route based on estimated driving time. A user may also choose a driving tour with the shortest route based on estimated distance traveled. In one embodiment, the starting and end points of the driving tour may be fixed as the first and last destination on a destination list, and the other destinations may be renumbered to match the travel route. The user may drag the destinations in the destination list to change the starting and end points of the driving tour. The starting point of the driving tour may also be adjusted as discussed previously. Accordingly, the user may permit the order of destinations to be selected automatically to achieve the relatively shortest or quickest route.

Additional embodiments of the invention enable a user to choose the order or sequence of destinations within a selected list. While sometimes the user may want to enable the systems provided herein to choose a route in a certain order to achieve a relatively better or shorter travel time, the user may alternatively want to adjust the order for a variety of personalized reasons such as having already scheduled appointments to see properties or to meet with realtors and other parties at particular times. In accordance this embodiment, users can choose and create customizable driving tours, where the travel route may be determined to visit destinations in the same order that they may appear on a destination list. In order to modify the customizable driving tour, a user may drag destination listings that appear on the destination list to the desired order and select an update option. For example, a real estate agent may want to use the customizable driving tour and arrange the travel route to save the best property for last, or arrange the route to accommodate a scheduled appointment. Whenever a user chooses a new driving tour option or updates the customizable driving tour, the new route may be displayed on a map, and a tour summary showing the driving directions may be updated. The system may have a default travel route, such as the quickest route.

The system may also support additional functions, such as delivery options to print or email the geographic map and tour summary with driving directions. For example, the system may provide a "print" and an "email" option that the user may click on, which may perform the desired function.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The features and advantages of the invention may be further explained by reference to the following detailed description and accompanying drawings that sets forth illustrative embodiments.

DETAILED DESCRIPTION OF INVENTION

While preferable embodiments of the invention are shown and described herein, it will be obvious to those skilled in the art that such embodiments are provided by way of example only. Numerous variations, changes, and substitutions will be apparent to those skilled in the art without departing from the spirit and scope of the invention. It should be understood that various alternatives to the embodiments of the invention described herein may be employed in practicing the invention. It is intended that the following describe exemplary methods and apparatus falling within the scope of the invention.

Figure 1:
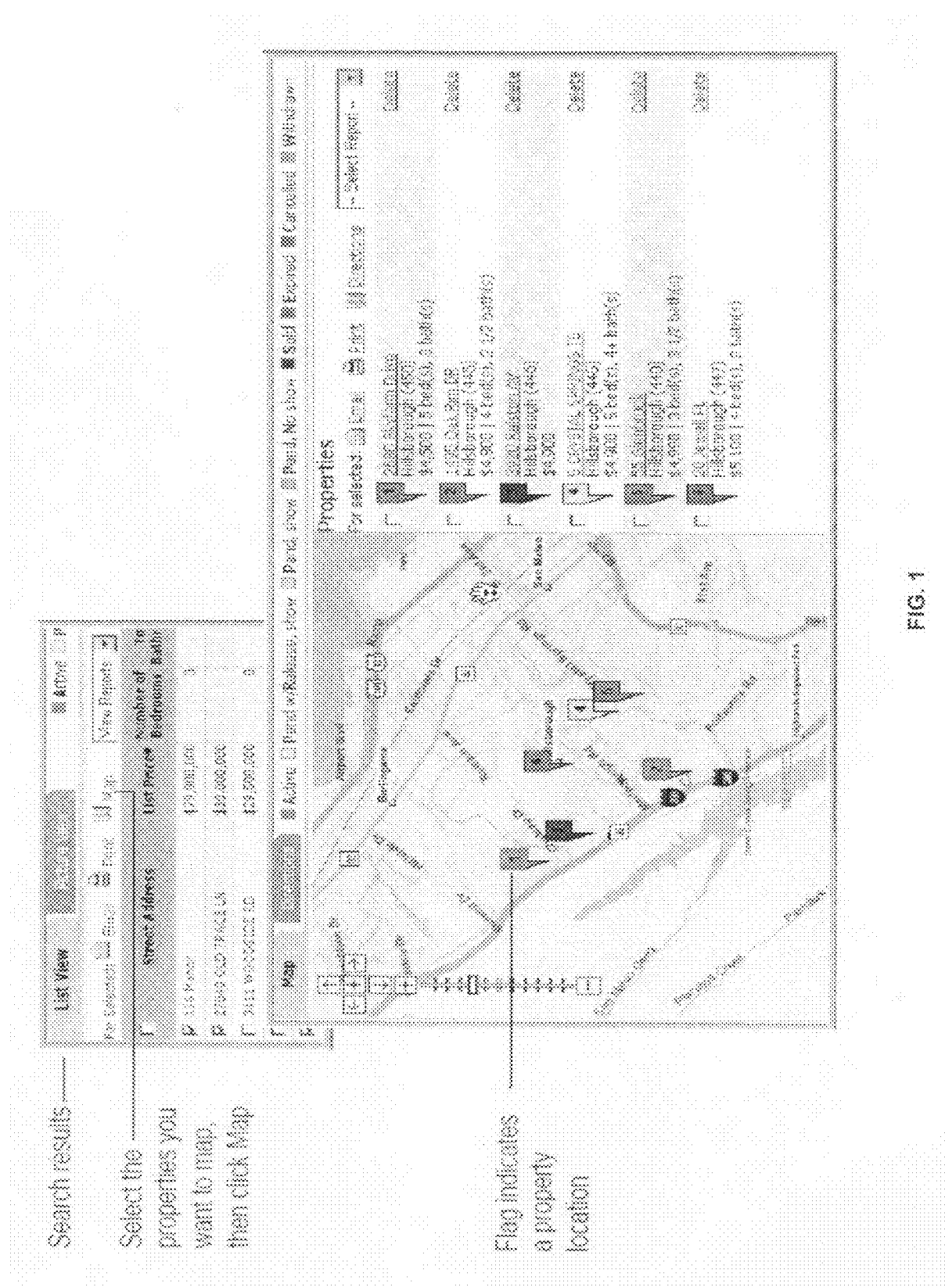
FIG. 1 shows a screenshot with search results displayed in a list view and a map showing selected destinations with a destination list.

Referring to the drawings in detail, FIG. 1 shows a screenshot with a window showing search results and a window showing a map view, including a map of selected destinations and a destination list, according to one embodiment of the invention. While preferable embodiments of the invention provide systems and methods that may be Internet based or implemented in a browser environment for services available online, it shall be understood that any of the embodiments of the invention described herein may be modified for other computing environments including Windows, Apple Macintosh or UNIX applications.

Figure 2:
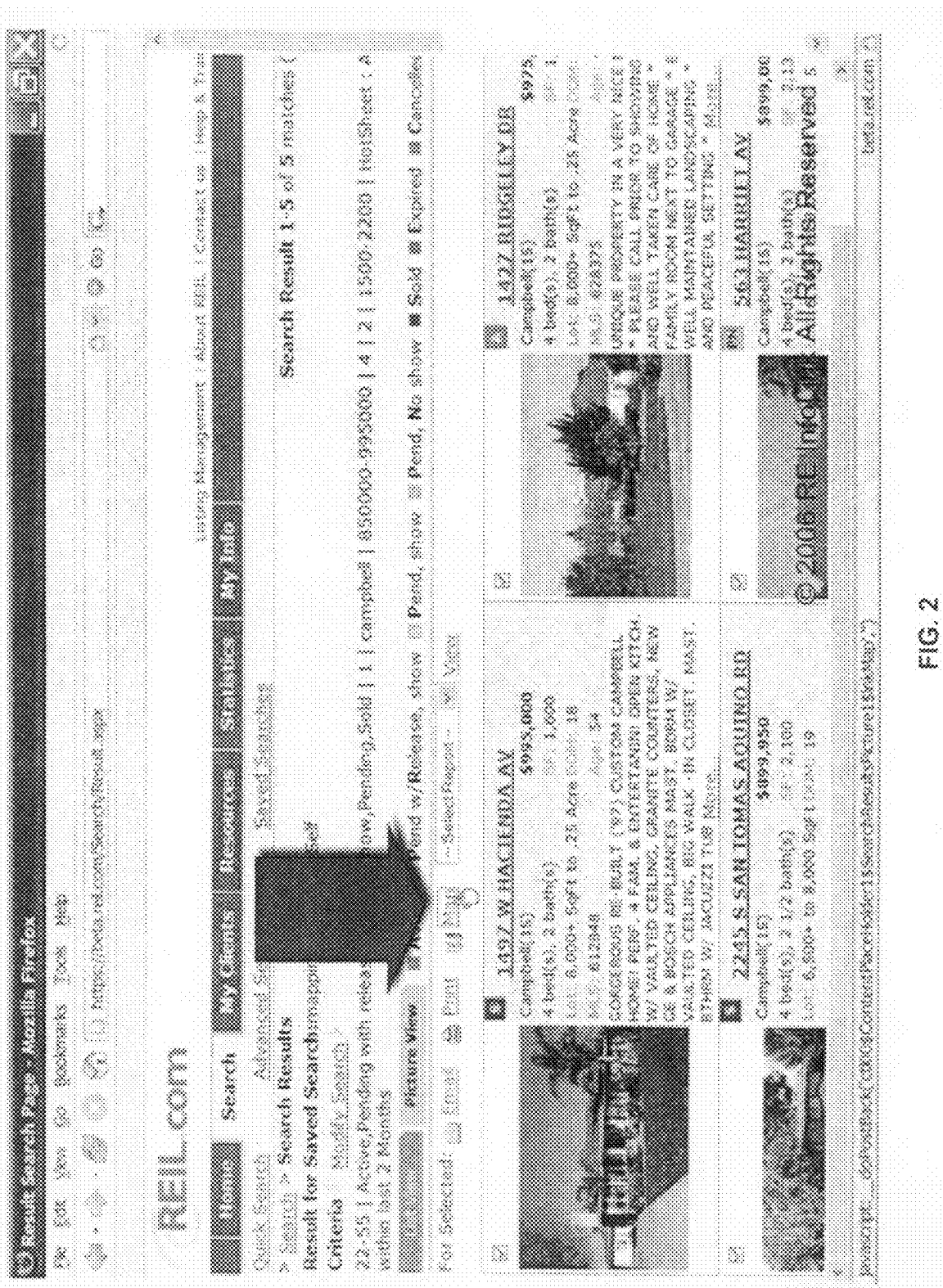
FIG. 2 shows a screen shot with search results displayed in a picture view and a mapping option.

In one embodiment of the invention, mapped destinations may be chosen from the results of a destination search. Search results may be displayed in more than one view format, and options may be provided to allow a user to switch between views. For instance, the user may be able to switch views using tabs. For example, the results of a destination search may be displayed in a list view with a mapping option. From a given set of search results, a user may select the properties to map. For example, a user may select a property by putting checks next to destinations that may be selected for mapping. FIG. 2 shows a screen shot with search results in a picture view with brief descriptions, and a mapping option. The user may select destinations to map from the picture view as well.

In one embodiment of the invention, the map view may include a destination map, a destination list, view options, and a key.

The destination map may be marked with destination indicators, which may have characteristics to provide more information about a destination. For example, a destination indicator may be a flag that shows a number that may correspond to a numbered flag of a destination as it appears on a destination list. The flags may be color coded to indicate a category. For example, a category may be a status of a real property listing, such as if the property is active, pending with release and being shown, pending and being shown, pending and not being shown, sold, expired, cancelled, or withdrawn.

The destination list may include a list of destinations which may be marked with flags that may correspond to flags that serve as destination indicators on the map. The destination list may include a list for addresses of the destinations. In addition to addresses, the destination list may also show additional details about destinations. For example, if the destinations were real property listing destinations, the destination list may also show information about pricing, numbers of rooms, or other property features. The destination list may also include an option for deleting a destination from the list. A destination that is deleted from the list may also remove the corresponding destination indicator from the map. The destination list may also include selection options for each of the destinations. For example, the selection option may be a box that the user can check in order to select destinations that will be part of a driving tour. The destination list may also include delivery options, such as an option to email or print selected destinations.

View options may allow a user to switch between a map view and a directions view that may show a driving tour and provides driving directions. For instance, the user may be able to switch views using tabs. The map view may also include a key that may show the categories of what the color coding of the flags mean.

Figure 3:
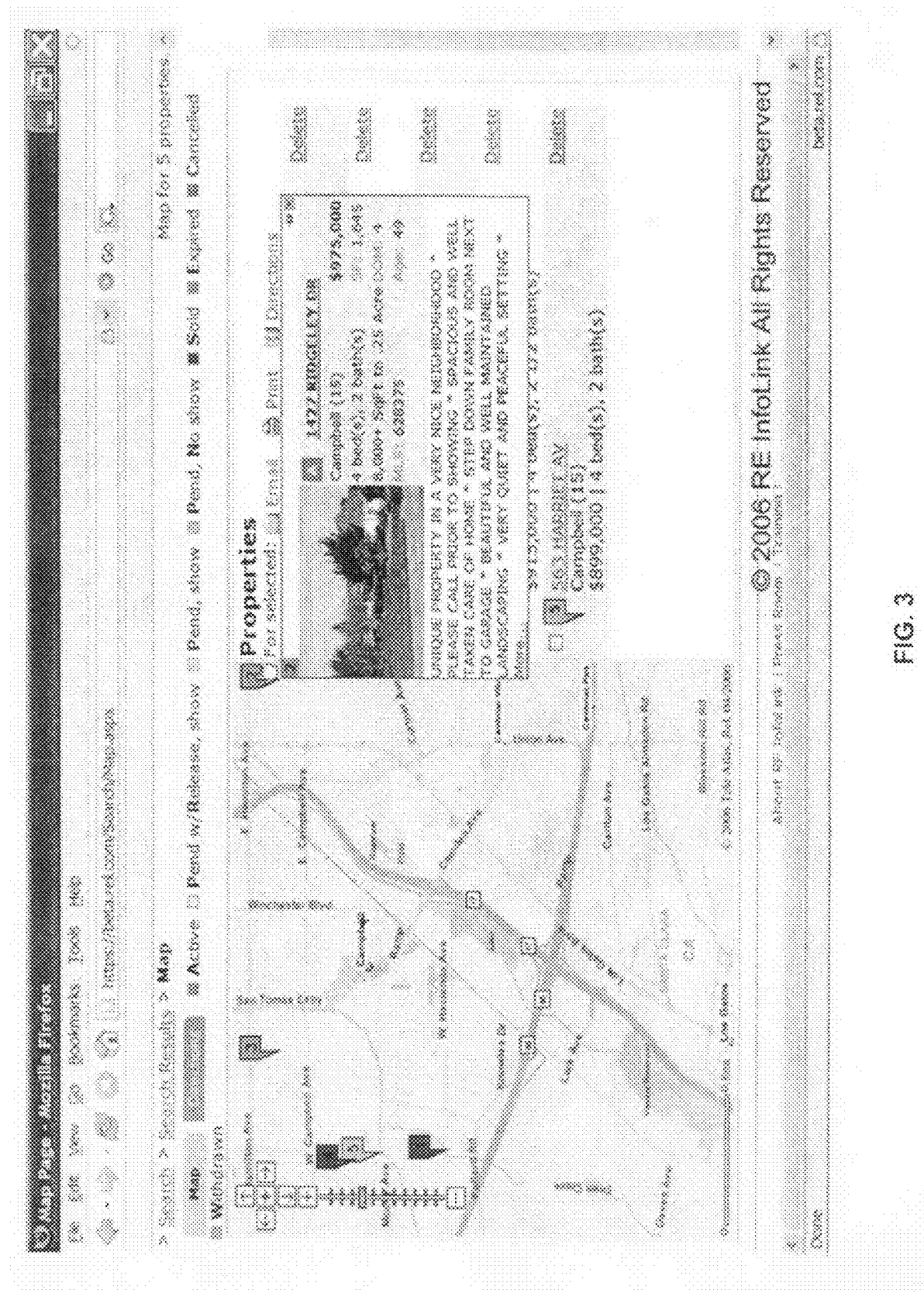
FIG. 3 shows a screen shot with a brief description of a destination while a mouse pointer is over a flag on a destination list.
Figure 4:
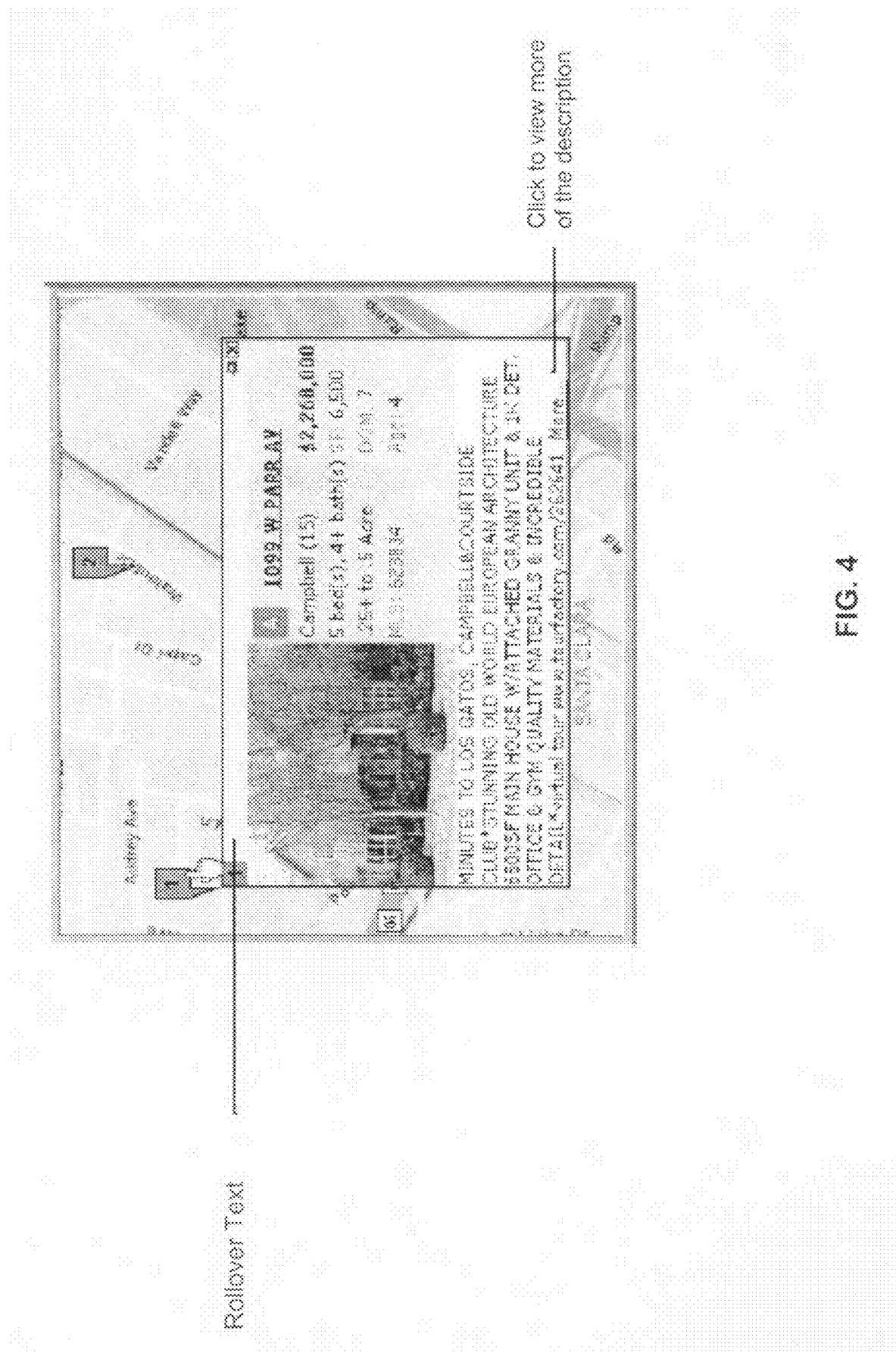
FIG. 4 shows a screen shot with a brief description of a destination while a mouse pointer is over a flag on a map.

FIG. 3 shows a screen shot with a brief description of a destination while a mouse pointer is over a flag on a destination list. After a user has mapped selected destinations, the user may also choose to view information about a destination. The user may view destination detail by interacting with a destination indicator. For instance, the user may rest the user's mouse pointer over a flag on a destination list. Alternatively, FIG. 4 shows the user may rest the user's mouse pointer over the corresponding flag of a destination on a destination map.

In one embodiment, the brief description of the destination may appear as a pop-up window. The pop up window may remain visible as long as the user's mouse is over the flag. In one instance, the brief description may be of a real property listing and may include a summary of essential listing information, such as a picture of the property, the address, the number of rooms, the size, the price, the age, and other features of the property.

Figure 5:
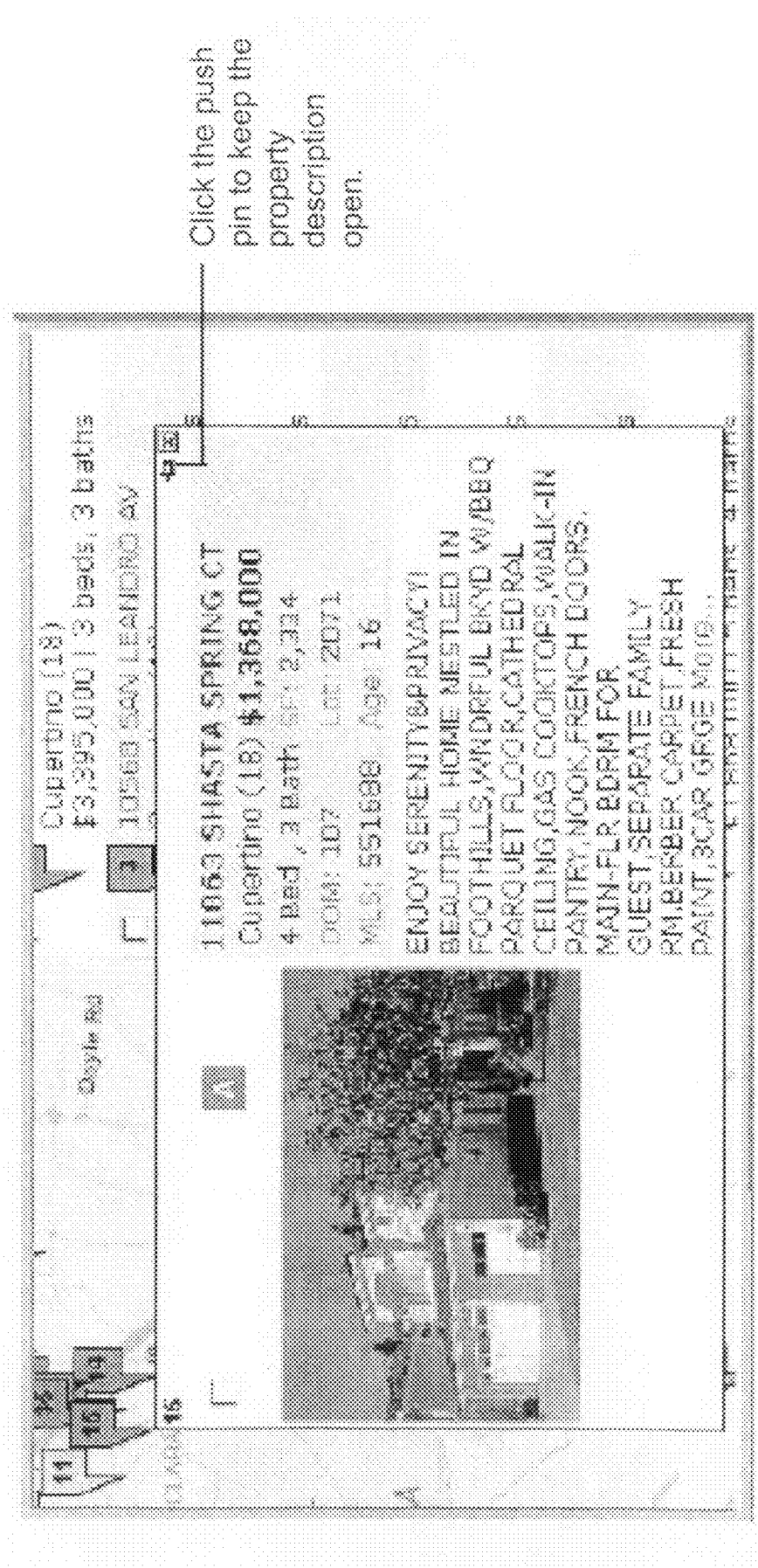
FIG. 5 shows a screen shot with a brief description of a destination with an option to keep it open.

FIG. 5 shows a brief description of a destination with an option to keep it open. A pop up window may include an option that allows a user to keep the brief description open even when the user's mouse is not over the flag. In one instance, the option may be a button or a graphic, such as a push pin, that allows the description to remain open. The pop up window may also have an option that allows the user to close the window after the user had selected to keep it open.

The brief description may also include an option for a user to view a more detailed description of the destination. In one embodiment of the invention, the user may select the option to view a more detailed description of the destination by clicking on an option to view more in the brief description.

Figure 6:
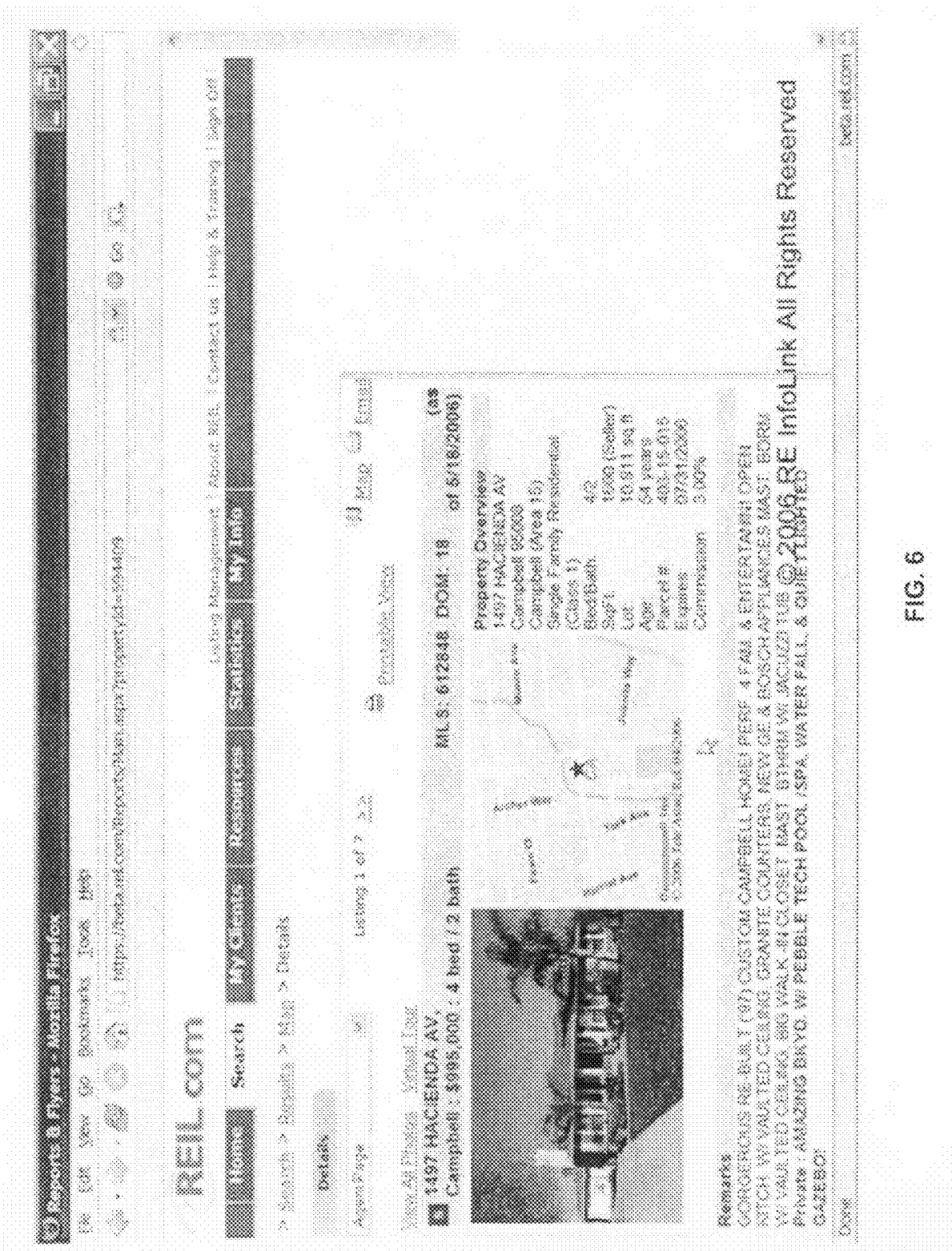
FIG. 6 shows a screen shot with a detailed description of a destination.

FIG. 6 shows a detailed description of a destination. In one embodiment, viewing the detailed description may direct a user away from a previous view and to a new screen showing the detailed description. A detailed description screen may include the detailed description itself, a navigation path, and additional information options. The navigation path may show the site hierarchy and how the user arrived at the detailed description screen. The user may return to a map view by clicking on a "map" option which may appear on the navigation path in the detailed description screen. Additional information options may include additional information such as photos or a virtual tour, or may include means of accessing additional information such as the detailed description of other selected destinations.

Figure 7:
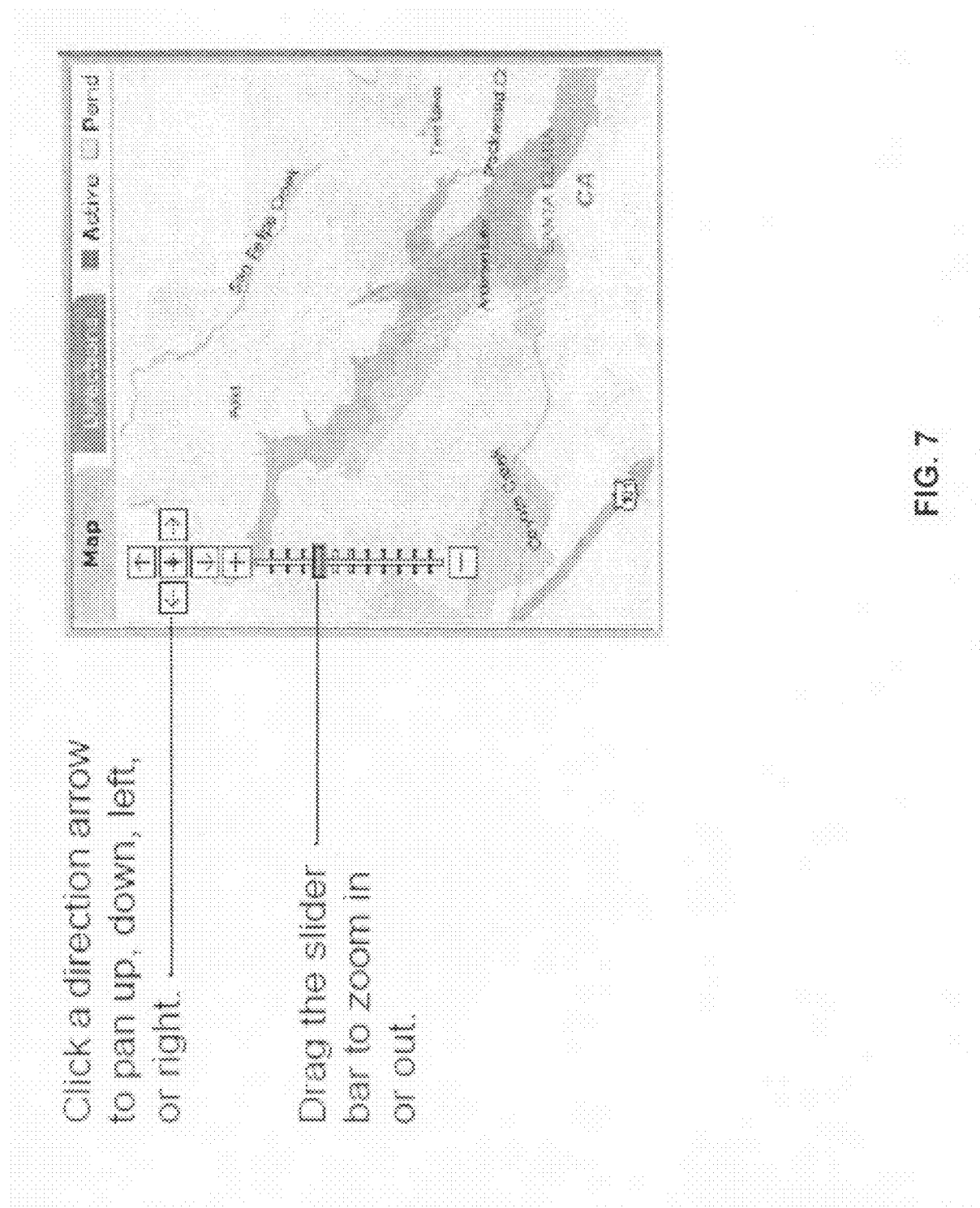
FIG. 7 shows a screen shot with a user control for zooming and panning a map.

FIG. 7 shows controls that may allow a user to zoom in or out, or pan up, down, left, or right on a map. The controls may include a direction arrow arrangement and a slider bar. A user may click a direction arrow to pan up, down, left or right. The user may also pan by clicking on the map and dragging. The user may drag the slider bar to zoom in or out, or alternatively click on 'plus' or 'minus' squares at the ends of the bar.

Figure 8:
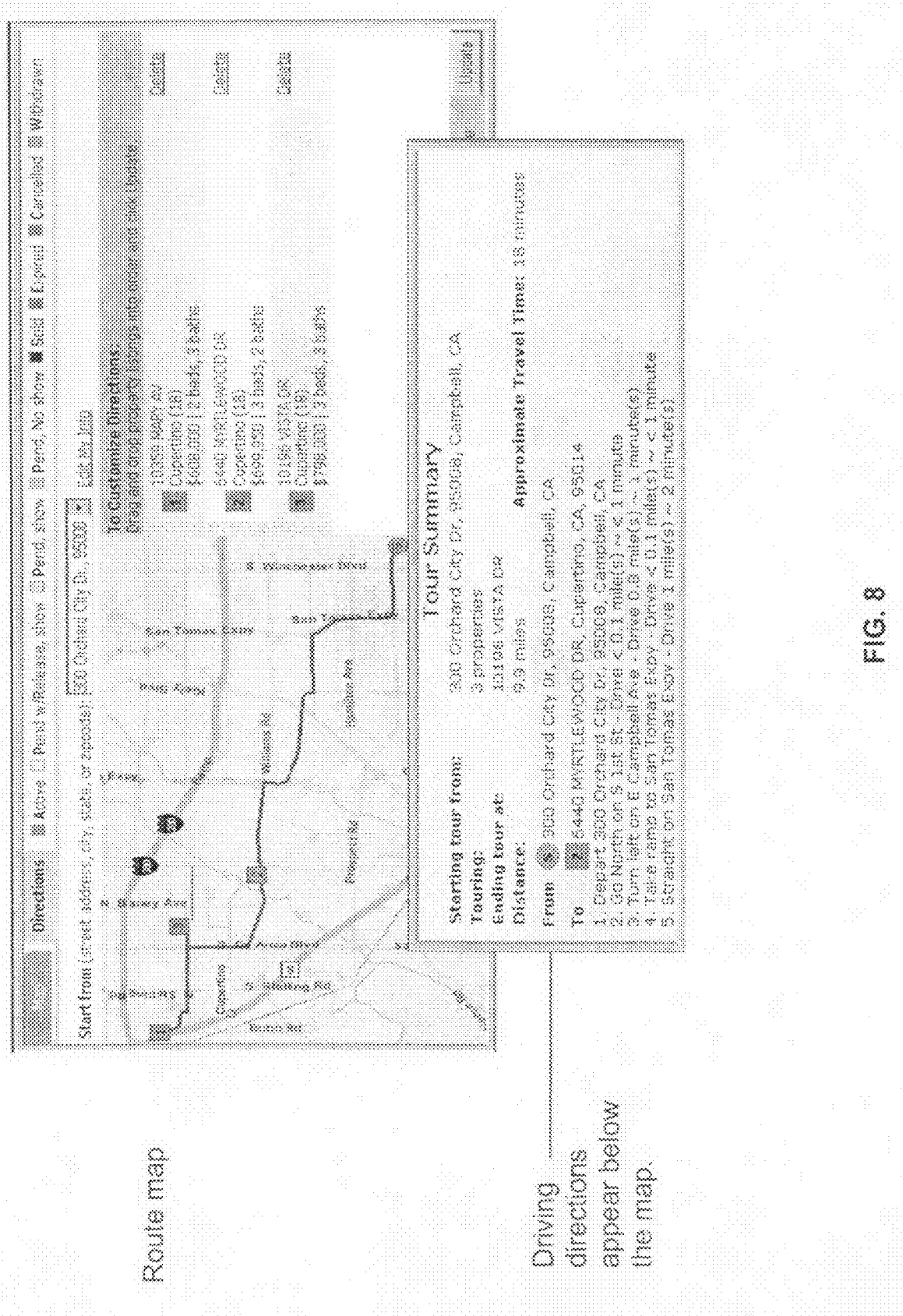
FIG. 8 shows a screen shot with a map of a driving tour, a destination list, and a tour summary.

FIG. 8 shows a screen shot with a map of a driving tour, a destination list, a tour summary, a starting point, view options, a key, and delivery options. As discussed earlier, a user may select destinations from a destination list in a map view to be a destination for the driving tour.

Figure 9:
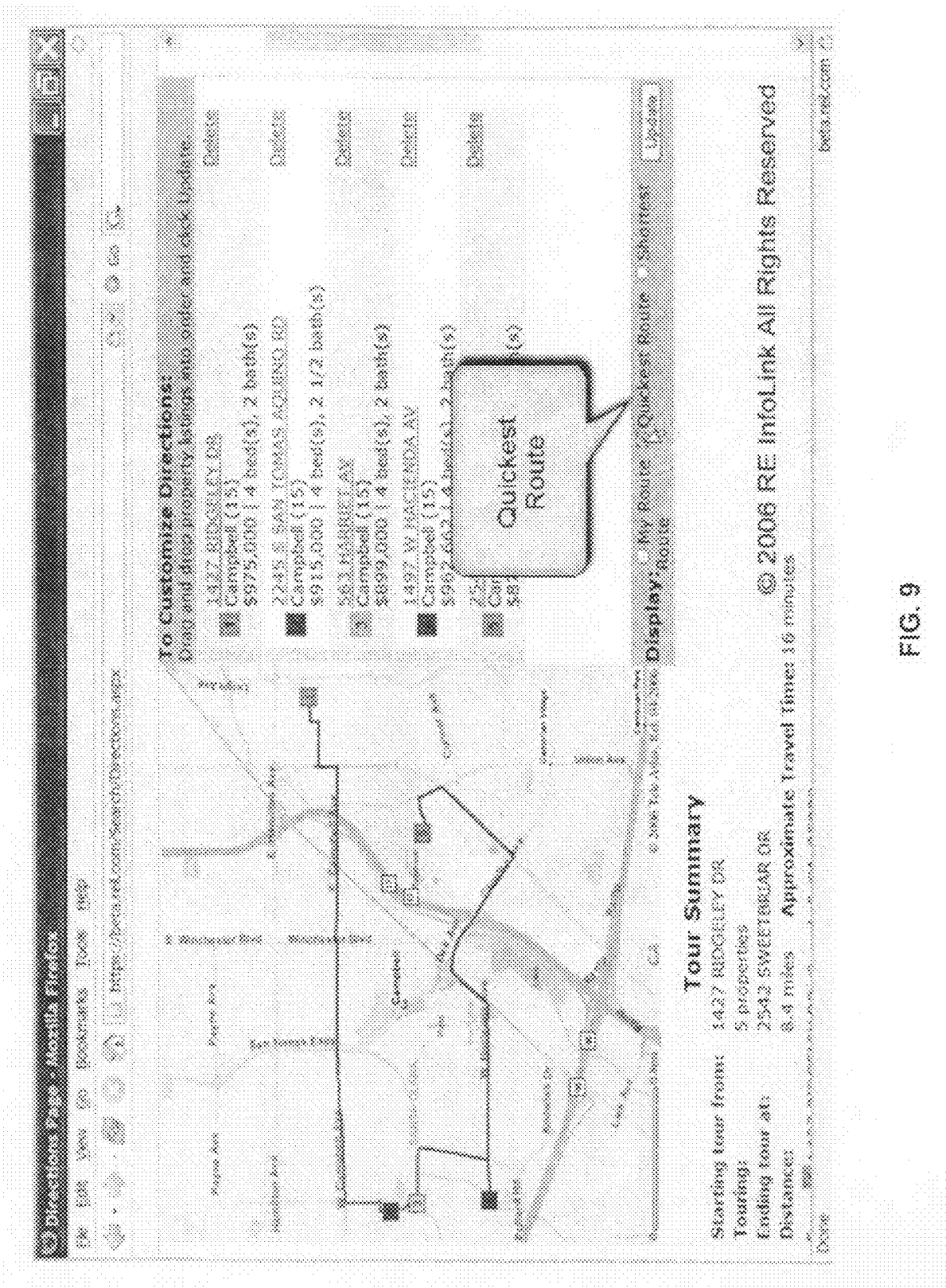
FIG. 9 shows a screen shot with a map of the quickest route.

The maps described herein may include destinations selected for driving tours and a travel route that connects them. The user may select different from different available options for the travel routes of the driving tours. For instance, FIG. 9 shows a driving tour with the quickest route based on estimated driving time. It shall be understood that quickest or shortest are relative terms herein that may be used to describe driving or travel times based on units of time such as hours or minutes. In some instances, these terms describe the amount of time that takes into consideration reasonable or practical considerations when traveling from place to place. For example, the shortest or most direct route to a particular location may be calculated with a 20 mile drive on a freeway in accordance with the invention. It may actually be shorter however to travel by exiting the freeway at some point, proceed down an alley or uncommon throughway, and return to the freeway. But the shortest route calculated herein incorporates more common or typical driving patterns which takes into account the different types of roadways or surface streets. Various types of weighting systems may be incorporated with the invention to differentiate streets with the smallest weighted, eg, alleys, and minor streets to the higher weighted roadways such as expressways and freeways. There may be a predetermined preference for higher weighted alternatives if or when available at selected points along a route or driving tour in accordance with this embodiment of the invention. The algorithms selected for these calculations may be created for certain regions specifically or incorporate those designed for other driving directions and related products such as geographic information systems GIS and mapping software (ESRI, TeleAtlas).

Figure 10:
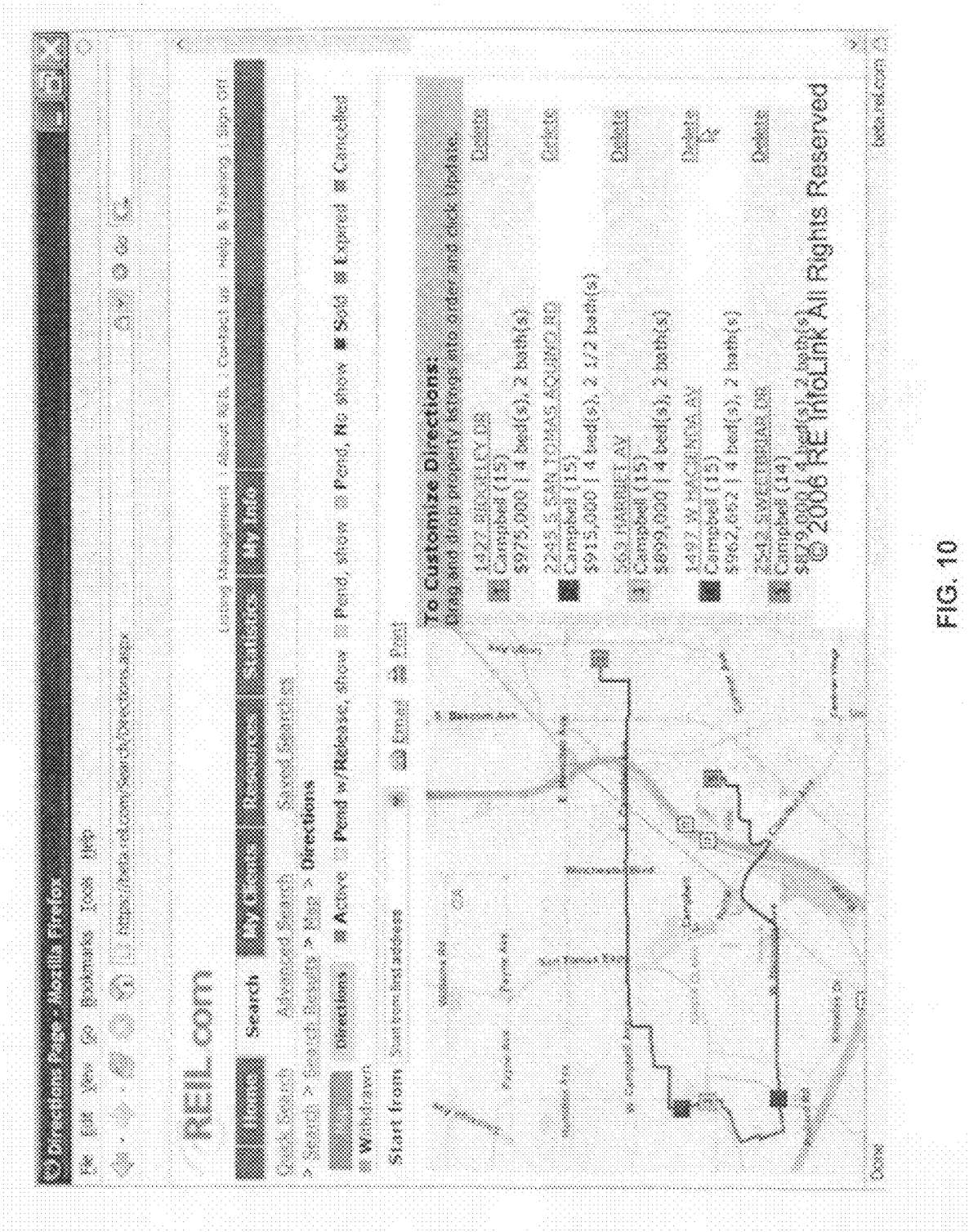
FIG. 10 shows a screen shot with a map of the shortest route.
Figure 11A:
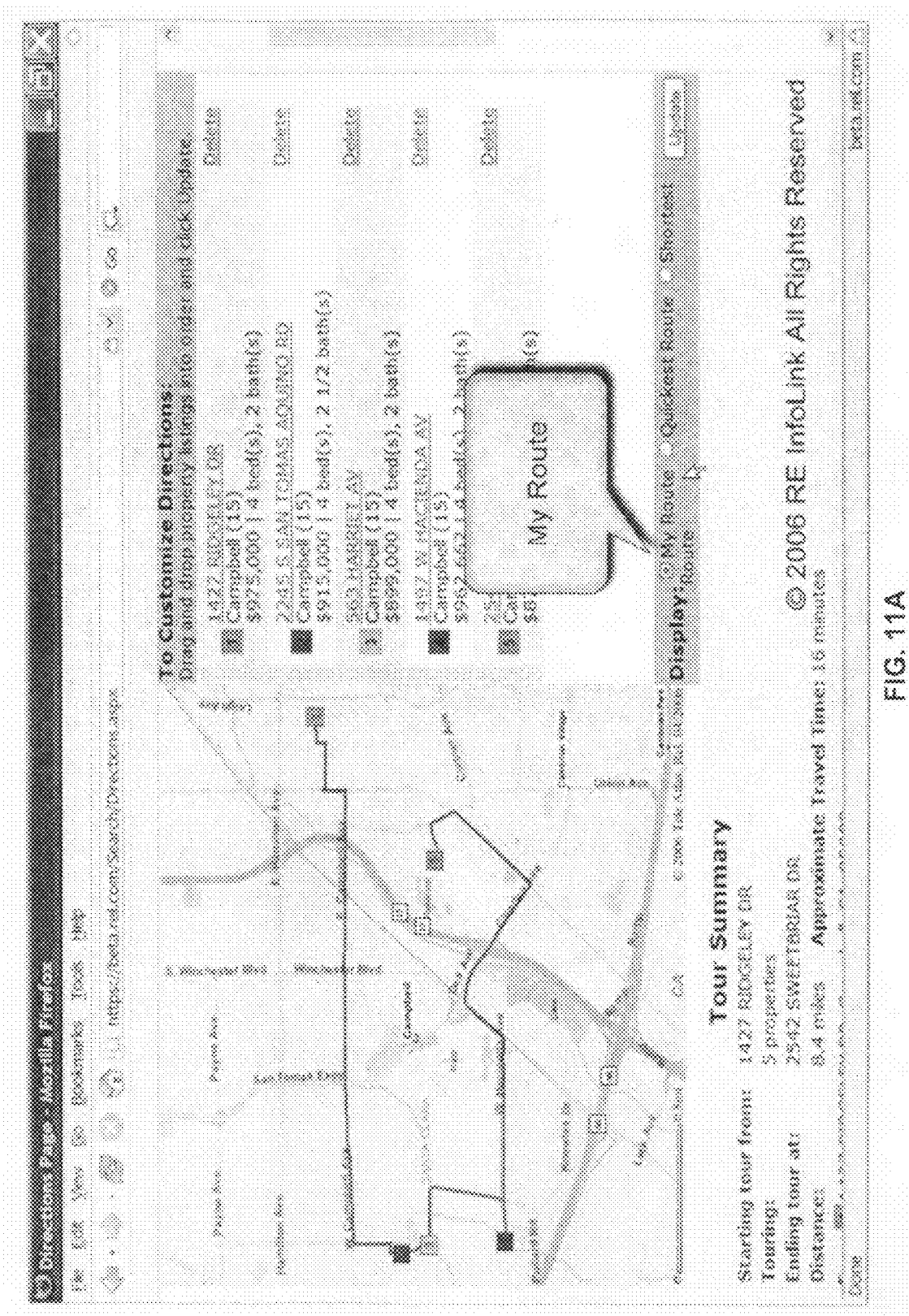
FIG. 11A shows a screen shot with a map of a driving tour, and a destination list, where the order of destinations may be modified.

Alternatively, FIG. 10 shows a driving tour with the shortest route based on estimated distance traveled. FIG. 11A shows a customizable driving tour, where the travel route may be calculated based on visiting the destinations in the same order that they may appear on a destination list. In one embodiment of the invention, the destinations may be real property listings. A real estate agent may want to use the customizable driving tour and arrange the travel route to save the best property for last, or arrange the route to accommodate a scheduled appointment.

The destination list may show the destinations listed with numbers indicating their order on the destination list, as well as colors indicating a category pertaining to the destination. The destination list may also include a display option, where a user may select different options for travel routes. In one embodiment of the invention, the different options may include the quickest route, the shortest route, and a customizable route. The user may select one of the routes, and select an update option, which may implement the new travel route in both the destination list and the map.

Figure 11B:
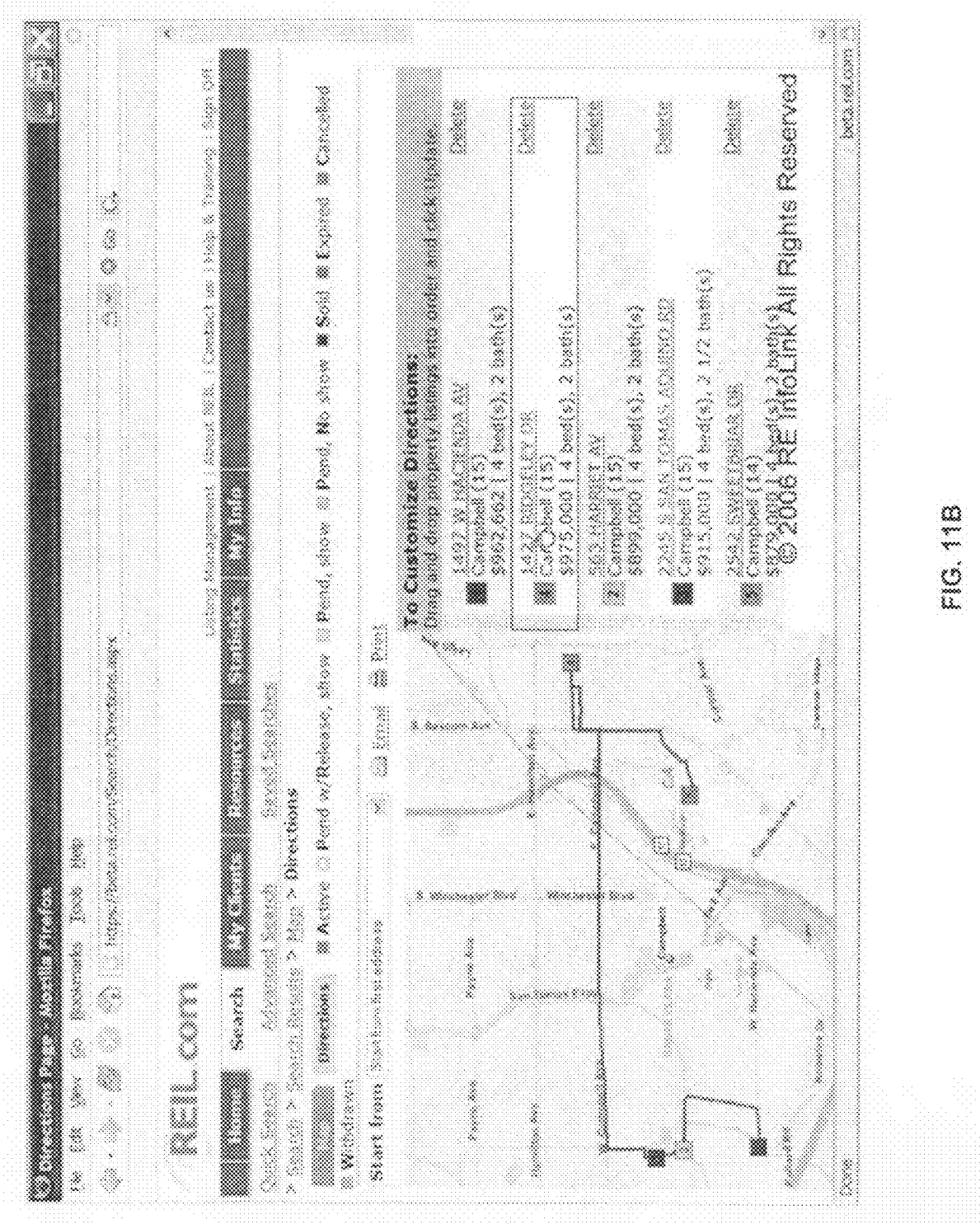
FIG. 11B shows a destination being dragged on a destination list.
Figure 11C:
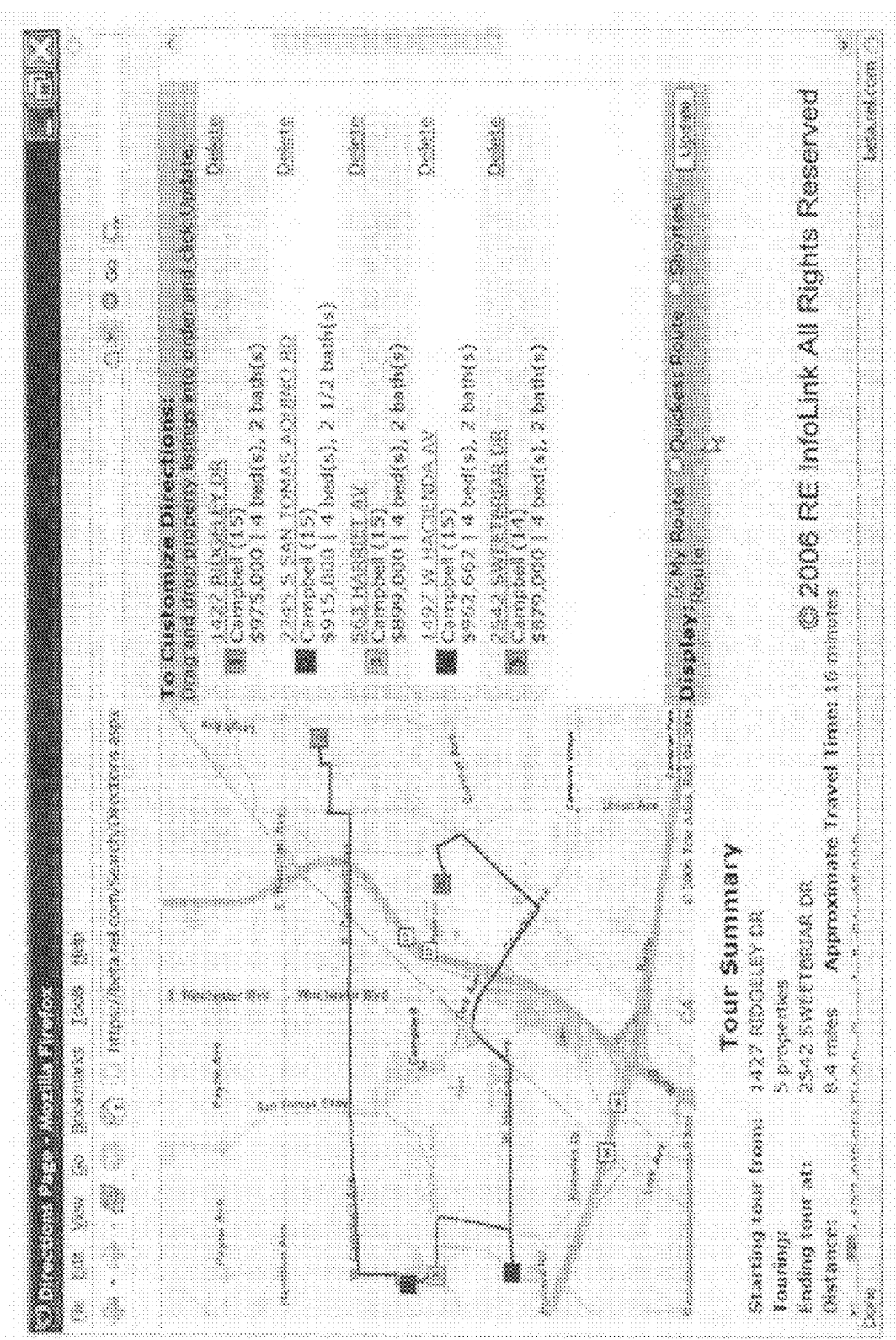
FIG. 11C shows an updated destination list and map.

The destinations on the destination list may be rearrangeable. The user may be able to reorder the destinations by clicking and dragging the destinations in the list. FIG. 11A shows a customizable route option maps a driving tour where destinations are visited in the order they appear on the destination list. FIG. 11B shows a destination being dragged on the destination list. FIG. 11C shows an updated destination list and map after the destinations have been rearranged. In one embodiment of the invention, the starting and end points of a driving tour may be fixed as the first and last destination on the destination list for any of the travel route options, and the other destinations may be renumbered to match the driving order. The user may drag the destinations in the destination list to change the starting and end points of the driving tour. The starting point of the driving tour may also be adjusted as follows.

Figure 12A:
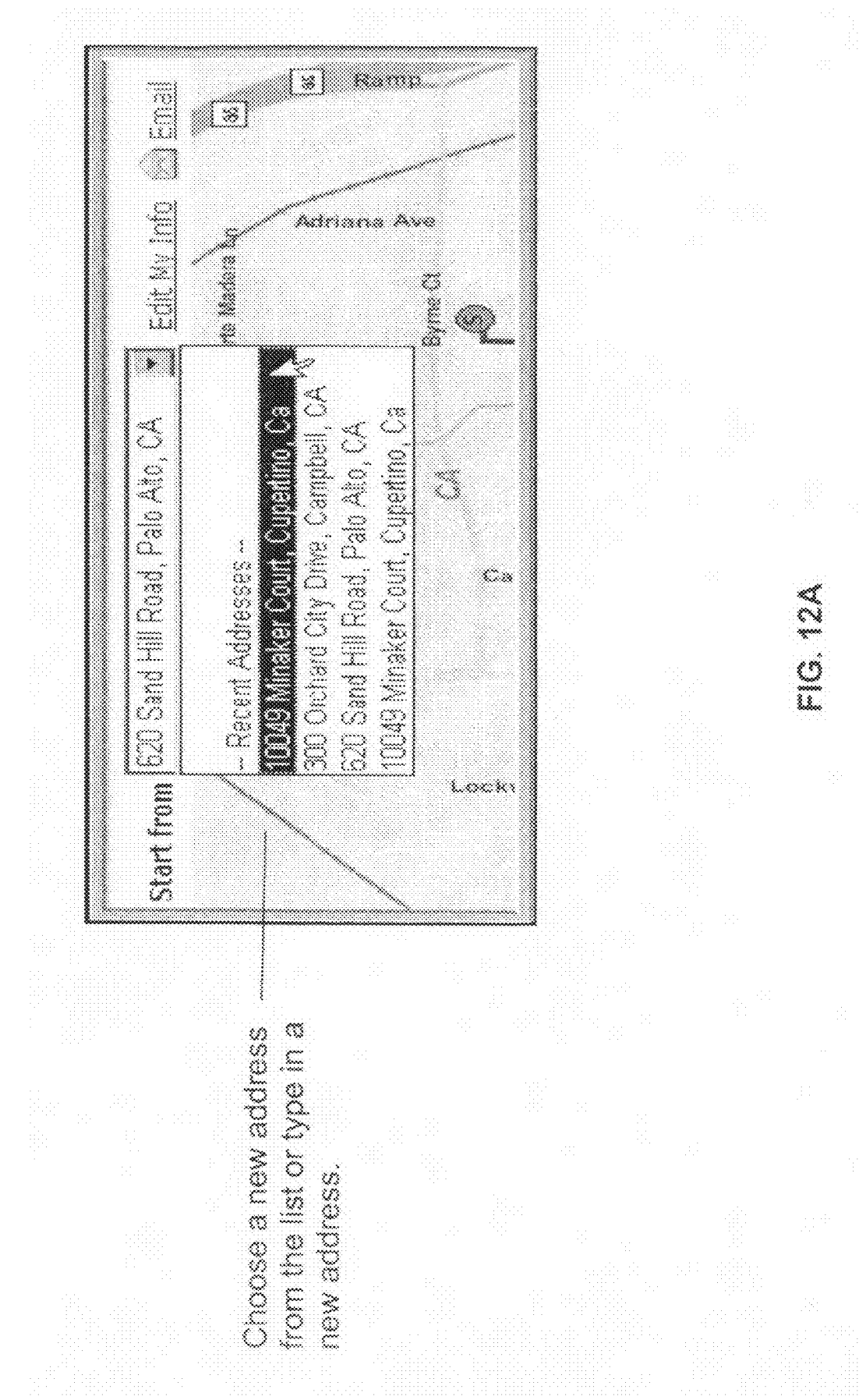
FIG. 12A shows a screen shot with a drop-down list starting point selection option.
Figure 12B:
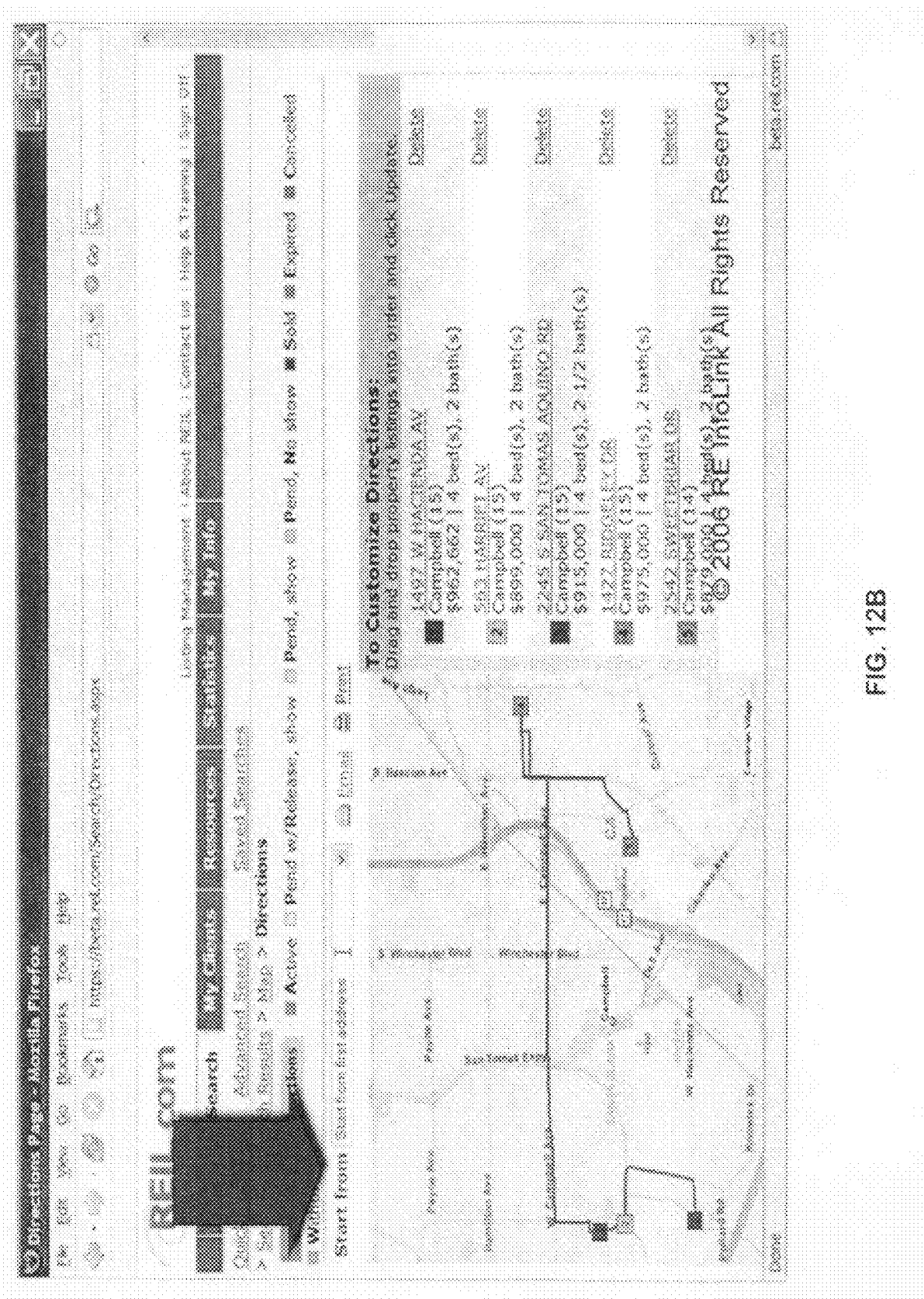
FIG. 12B shows a screen shot with a field typing starting point selection option.

The starting point of a driving tour may include a field displaying the current starting address. The starting point may be stored in a drop-down list, which may include addresses stored on the system for the user. For example, the addresses stored may include office and home addresses for the user, or any other addresses that the user may have recently entered. FIG. 12A shows how a user may choose to change the starting location by selecting a new address from a drop-down list. FIG. 12B shows how a user may change the starting location by typing in a new address. After a user has selected a new starting point, the user may hit an update option so that the route map and driving directions may be updated with the new starting point.

Figure 13:
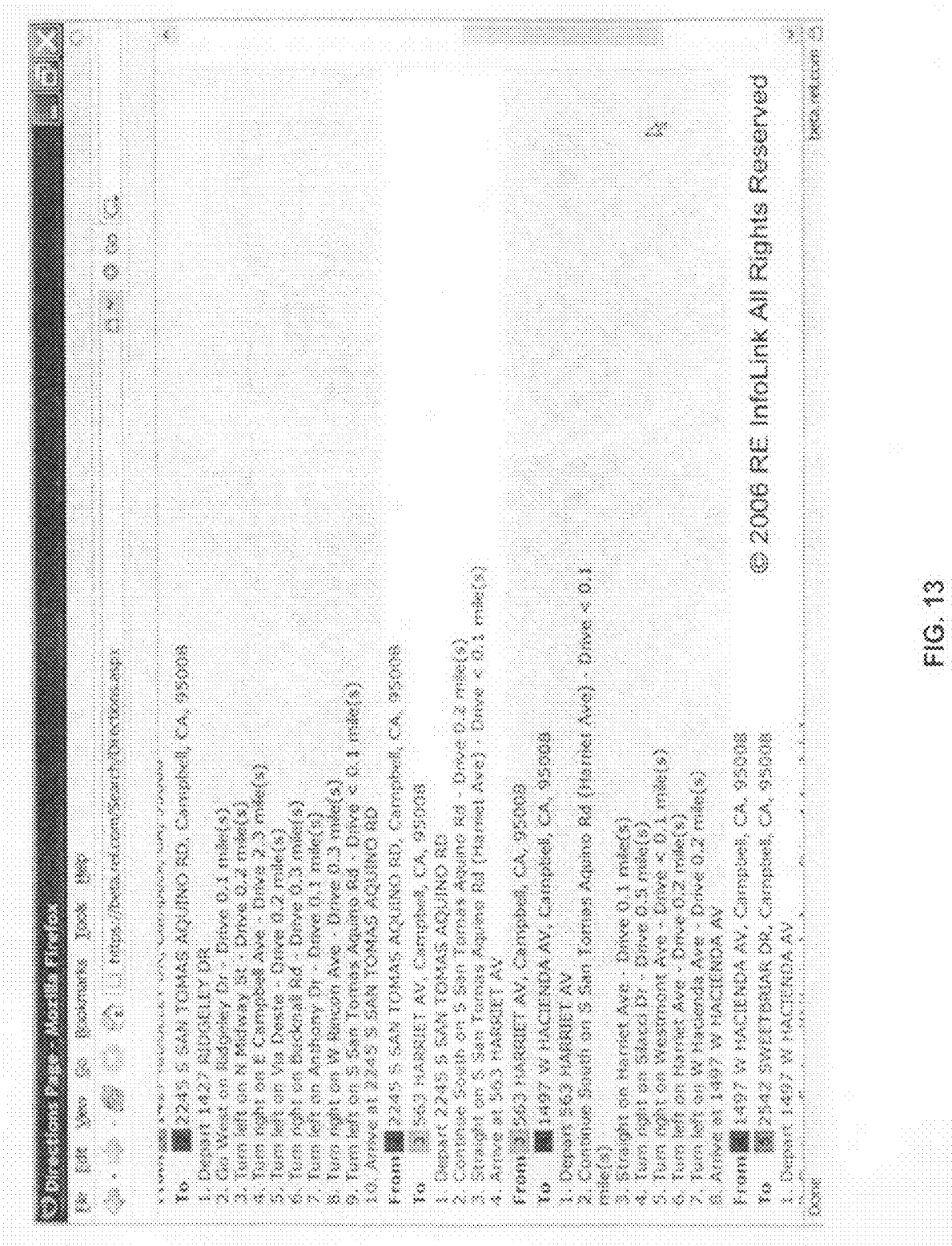
FIG. 13 shows a screen shot of a tour summary.

The tour summary may show driving directions for an entire driving tour or a selected group of one or more destinations. For example, FIG. 13 illustrates how driving directions may be broken up by destination. In one embodiment of the invention, a tour summary and set of driving directions may appear below a map. The directions may include step-by-step instructions from one destination to another along a driving tour of real property listings. In addition to the name of each street traveled, the directions may be given at each turn (left L, right R, U turn) and the distance traveled on each street. Other mapping features may be incorporated into the driving tour systems and methods provided herein for visiting real property listings such as displaying estimated arrival or travel times for each segment or total travel times, or total distance traveled.

View options may allow a user to switch between a map view and a directions view that shows a driving tour and provides driving directions. For instance, the user may be able to switch view using tabs. To display a map with driving tour and providing driving directions, a directions tab may be selected. The directions view may also include a key that may show what color coding of the flags means for various categories.

Figure 14:
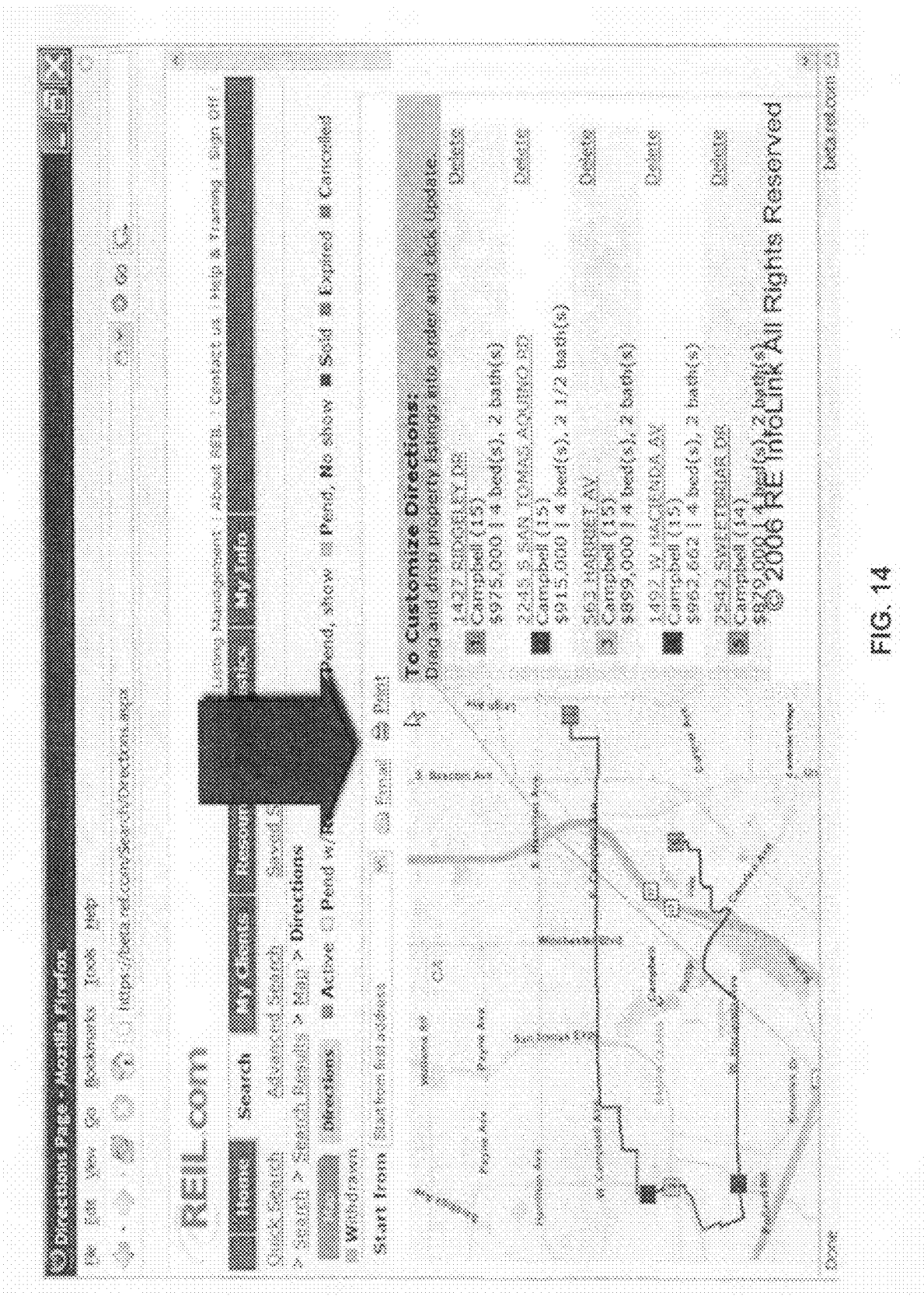
FIG. 14 shows a screen shot highlighting an email or print option.

Delivery options may include additional functions to print or email the geographic map and tour summary with driving directions. For example, FIG. 14 shows a link to print and a link to email the geographic map and tour summary. The user may click on these links, which may perform the desired function.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of mapping driving tours for real property listings comprising:
   conducting a real property listing search using one or more real property search criteria;
   displaying at least two real property listing search results;
   selecting at least two real property listings from the real property listing search results to map;
   displaying a real property destination list with at least two real property listings; and
   displaying a geographic map with:
      a real property listing indicator corresponding to each real property listing on the real property destination list; and
      a travel route indicating a selected start point and visiting each real property listing; and
   displaying a real property tour summary with driving directions for the travel route to each real property listing, and wherein the travel route is customizable by a user to enable visiting each real property listing according to a selected sequence based at least in part on available viewing schedules or personal preferences and not solely on the shortest or most efficient travel route.

2. The method of claim 1 wherein the real property listings in the real property destination list are selected by a user conducting the real property listing search.

3. The method of claim 1 further comprising displaying a brief description of the real property listing when a mouse pointer is over the real property listing indicator.

4. The method of claim 1 further comprising displaying a description for each real property listing.

5. The method of claim 1 wherein the geographic map allows a user to zoom and pan.

6. The method of claim 1 wherein the travel route is a route with minimal estimated driving time.

7. The method of claim 1 wherein the travel route is a route with minimal estimated driving distance.

8. The method of claim 1 wherein the selected starting point of the travel route is determined by selecting a real property listing on the real property destination list to be the start point.

9. The method of claim 1 wherein the selected starting point of the travel route is determined by selecting an address stored for a given user from a drop-down list.

10. A method of creating a driving tour for real property listings comprising:
    selecting at least two real property listings from a list of real property listings to map;
    displaying each selected real property listing in a real property destination list;
    displaying a real property listing indicator on a geographic map corresponding to each real property listing on the real property listing destination list;
    calculating a travel route that visits each real property listing on the real property destination list;
    displaying the travel route indicating a selected start point and visiting each real property listing in the geographical map; and
    displaying a real property tour summary displaying with directions for the travel route to each real property listing, wherein the travel route is customizable by a user to enable visiting each real property listing according to a selected sequence based at least in part on available viewing schedules or personal preferences and not solely on the shortest or most efficient travel route.

11. The method of claim 10 wherein the real property listings in the real property destination list are selected by a user.

12. The method of claim 10 further comprising displaying a description for each real property listing.

13. The method of claim 12 wherein the description for each real property listing includes at least one of: the real property listing address, the price, the number of rooms, a picture of the property, the size of the property, or the age of the property.

14. The method of claim 10 further comprising allowing a user to alter the order of real property listings in the real property destination list, thereby altering the travel route.

* * * * *